United States Patent [19]

Moriya et al.

[11] Patent Number: 5,660,781
[45] Date of Patent: Aug. 26, 1997

[54] PROCESS FOR PREPARING GLASS CERAMIC GREEN SHEETS

[75] Inventors: Yoichi Moriya; Yoshiaki Yamade, both of Nishinomiya; Koichi Uno, Nagoya, all of Japan

[73] Assignees: Sumitomo Metal Industries, Ltd., Osaka; Sumitomo Metal Ceramics, Inc., Mine, both of Japan

[21] Appl. No.: 493,996

[22] Filed: Jun. 23, 1995

[30] Foreign Application Priority Data

Jun. 28, 1994 [JP] Japan .................................. 6-146609

[51] Int. Cl.$^6$ ............................... B29D 7/00; C04B 35/64
[52] U.S. Cl. ........................ 264/212; 264/144; 264/650
[58] Field of Search .............................. 156/89; 264/63, 264/144, 212

[56] References Cited

U.S. PATENT DOCUMENTS

| | | | |
|---|---|---|---|
| 4,621,066 | 11/1986 | Nishigaki et al. | 501/128 |
| 4,833,104 | 5/1989 | MacDowell et al. | 501/10 |
| 4,833,497 | 5/1989 | Claar et al. | 29/623.5 |
| 5,306,646 | 4/1994 | Lauf | 437/2 |
| 5,514,451 | 5/1996 | Kumar et al. | 428/210 |

FOREIGN PATENT DOCUMENTS 59-195573  11/1984  Japan .

*Primary Examiner*—Donald E. Czaja
*Assistant Examiner*—Jacqueline A. Ruller
*Attorney, Agent, or Firm*—Burns, Doane, Swecker & Mathis, LLP

[57] ABSTRACT

Low-firing glass ceramic green sheets useful in the production of glass ceramic multilayer substrates are prepared from a coarse raw powder material comprising a $B_2O_3$-containing glass powder. The coarse raw powder material is initially subjected to wet grinding, either in an alcohol-free organic solvent in the presence or absence of an organic binder, or in an alcohol-containing organic solvent in the presence of an organic binder, until the powder is comminuted to a particle size suitable for tape casting. The wet-ground powder is slurried with an organic solvent and an organic binder, and the slurry is cast into sheets. The resulting green sheets have improved elongation and can be punched to form fine through holes with a small pitch.

22 Claims, No Drawings

PROCESS FOR PREPARING GLASS CERAMIC GREEN SHEETS

BACKGROUND OF THE INVENTION

The present invention relates to a process for preparing glass ceramic green sheets for use in the production of substrates in glass ceramic printed circuit boards on which electronic devices such as LSI's are mounted.

In recent years, plastic substrates, such as those made of a phenolic resin or glass-reinforced epoxy resin, which have predominantly been used as substrates in conventional printed circuit boards, have rapidly been replaced by ceramic substrates, particularly ceramic multilayer substrates due to the demand for increased mounting density and improved reliability of printed circuit boards.

Ceramic multilayer substrates are usually produced either by the multilayer printing process or the green sheet laminating process. In the multilayer printing process, a conductive paste and an insulating paste are alternately applied in predetermined patterns onto a sintered or green ceramic sheet, which is then fired. The green sheet laminating process comprises laminating a plurality of green sheets, each having a desired circuit pattern printed thereon with a conductive paste and through holes (also called via holes) filled with a conductive paste, and co-firing the resulting laminate to sinter the green sheets and the conductive paste simultaneously. Of these, the green sheet laminating process is prevalent because a larger number of layers can be readily laminated with more precise circuit patterns.

As a ceramic material for ceramic substrates, alumina ($Al_2O_3$) has primarily been employed in view of its good electrical insulating properties and heat resistance and its relatively low material costs. Since alumina-based ceramics are sintered at a temperature as high as 1550° C., it is necessary to use a conductive paste containing a conductive powder of a refracfory metal, e.g, W (tungsten) or Mo (molybdenum) or a mixture thereof, to print alumina-based green sheets or fill through holes formed therein such that the conductive powder withstands the high temperature during firing without a significant loss of conductivity.

However, the electric resistivity of W and Mo is relatively high for a metal. Therefore, as circuits become finer and thinner to increase the mounting density, the resistance of circuits made of W or Mo is appreciably increased to such a degree that it may interfere with the function of the circuit by an increased signal delay.

In order to eliminate the problem just described which has been encountered by the use of W or Mo powder in a conductive paste, multilayer substrates of low-firing ceramic materials have been developed. These ceramic materials can be sintered at a temperature below 1000° C., and therefore it is possible to fire them along with a non-refractory, low-resistivity conductive metal such as Ag or Cu in a conductive paste to form substrates.

One class of low-firing ceramic substrates is a glass ceramic substrate. Glass ceramic substrates are attracting much attention for the reason that they have insulating properties and heat resistance comparable to conventional alumina substrates, a dielectric constant lower than alumina (leading to a reduced signal delay) and a thermal expansion coefficient close to that of silicon (thereby facilitating mounting of flip chips). The raw material for typical glass ceramic substrates is a combination of a boron-containing glass powder such as a powder of a borosilicate-based glass, $MgO-Al_2O_3-SiO_2-B_2O_3$-based glass, or $CaO-Al_2O_3-SiO_2-B_2O_3$-based glass, with a ceramic powder such as an alumina powder which serves as a filler.

Glass ceramic multilayer substrates are generally prepared as follows. A glass powder and a ceramic powder are subjected to wet grinding together in a ball mill until the particle size is reduced to a level suitable for use in tape casting into green sheets (e.g., 1 to 5 µm in average particle diameter), thereby achieving Both size reduction and thorough mixing of the glass and ceramic powders. Commercially available glass powders and ceramic powders are normally coarse and have an average particle diameter in the range of about 5 µm to about 100 µm. Therefore, it is necessary to reduce the particle size of the powders in the first step. The size reduction or comminution has normally been performed by wet grinding in a ball mill using water as a liquid medium.

Subsequently, the ground powder mixture is recovered and dried to remove water. In most cases the dried powder mixture is agglomerated. Therefore, the powder mixture is disintegrated before it is mixed with an organic solvent as a dispersing medium, an organic binder, and other additives such as a dispersant and plasticizer to form a slurry called a "slip". The slurry is then cast into sheets by a suitable method, typically by the tape casting method using a doctor blade, and glass ceramic green sheets are obtained after the sheets are dried to remove most of the solvent.

The resulting glass ceramic green sheets are punched to form through holes, if necessary, and a conductive paste is then printed onto each sheet to form a circuit pattern thereon and fill the through holes, if present. A plurality of such green sheets are laminated, and the resulting laminate is co-fired at a temperature below 1000° C. (usually between 900° C. and 1000° C.) to sinter the conductive paste and green sheets simultaneously to give a glass ceramic multilayer substrate. The firing step is usually preceded by a degreasing step whereby organics are removed from the laminate by heating to a temperature substantially lower than the firing temperature.

In the preparation of alumina-based ceramic green sheets which are fired at a higher temperature, it is known that a fine alumina powder which has been comminuted is processed in a wet ball mill, for purposes of disintegration and mixing with additives such as an organic binder, using an organic solvent as a liquid medium. See, Japanese Patent Application Kokai No. 59-195573(1984). However, such wet ball milling is not intended for comminution or substantial size reduction of the alumina powder. Whether the green sheets to be prepared are of a low-firing glass ceramic or a conventional high-firing ceramic such as alumina, wet ball milling in water has been employed in the grinding step to reduce the particle size of a raw material to a level suitable for tape casting.

In order to meet the recent demand for still higher integration of LSI's and further size reduction of printed circuit boards, through holes formed in green sheets are required to have a smaller diameter and a smaller pitch.

In general, when a ceramic green sheet is punched to form through holes with a smaller diameter and pitch, it is important to prevent as much as possible the formation of burrs around each hole and the formation of cracks between adjacent holes. For this purpose, it is advantageous that the ceramic green sheet have an increased elongation.

A ceramic green sheet is assured to have an increased elongation if the surfaces of the ceramic powder particles present in the sheet are completely covered with an organic binder, thereby improving the adhesion between ceramic powder particles.

In the prior art glass ceramic green sheets prepared in the above-described manner, however, it was frequently found that an increased elongation could not be achieved due to failure to completely cover the surfaces of the powder particles unless an excessively large amount of the organic binder is added. The use of the organic binder in a significantly increased amount not only adds to the manufacturing costs of the green sheets but also may increase the amount of residual carbon remaining after firing, which causes the resulting sintered substrate to turn gray and have a decreased insulation resistance.

SUMMARY OF THE INVENTION

It is an object of the present invention to provide a process for preparing glass ceramic green sheets which are assured to have an increased elongation in order to enable the sheets to be punched to form fine through holes with a small pitch using an organic binder in a limited amount.

The present invention provides a process for preparing boron-containing glass ceramic green sheets comprising the steps of: subjecting a coarse raw powder material which comprises a $B_2O_3$-containing glass powder to wet grinding until the particle size is sufficiently reduced to be suitable for tape casting; forming a slurry in which the wet-ground powder is dispersed in an organic solvent containing at least an organic binder; casting the slurry into sheets; and drying the resulting sheets.

In one aspect of the present invention, the wet grinding step is performed in an alcohol-free organic solvent in the presence or absence of an organic binder. In another aspect of the present invention, the wet grinding step is performed in an alcohol-containing organic solvent in the presence of an organic binder.

DETAILED DESCRIPTION OF THE INVENTION

The present inventors investigated why an increased elongation cannot be attained unless the amount of an organic binder added is significantly increased and found that some ingredient of the raw glass powder is dissolved out during wet grinding in water, thereby rendering the wet-ground glass powder porous and increasing the surface area thereof significantly. If the surface area is increased with a given particle size, an increased amount of an organic binder must be used to completely cover the surfaces of the powder particles.

The reason why the wet-ground glass powder becomes porous is thought to be as follows. As described above, a glass ceramic substrate is normally prepared from a boron-containing glass powder such as a borosilicate-based glass powder, $MgO-Al_2O_3-SiO_2-B_2O_3$-based glass powder, or $CaO-Al_2O_3-SiO_2-B_2O_3$-based glass powder. The incorporation of boron in the form of $B_2O_3$ in the glass powder is essential for a low-firing glass ceramic green sheet in order to decrease the softening point of the glass so that the green sheet can be fired at a low temperature below 1000° C. Although $B_2O_3$ itself is soluble in water, $B_2O_3$ in a glass formed by melting $B_2O_3$ along with other one or more ingredients is much less soluble in water if it is uniformly distributed in the glass. However, the distribution of $B_2O_3$ in a glass is, in fact, not ideally uniform and there exist separate $B_2O_3$-rich phases in the glass. $B_2O_3$ present in these phases of a glass powder is soluble in water to a certain degree and can be dissolved in water while the glass powder is being processed by wet grinding in water. Furthermore, as fresh surfaces are formed by grinding, they are immediately brought into contact with water, and $B_2O_3$ present in the $B_2O_3$-rich phases appearing on the fresh surfaces is dissolved in water. Repeated occurrence of these phenomena results in the formation of pores in the wet-ground glass powder, thereby significantly increasing the specific surface area of the powder.

According to the present invention, the coarse raw powder material comprising a $B_2O_3$-containing glass powder is processed by wet grinding in an organic solvent, i.e., in the absence of water, thereby preventing the formation of pores which lead to a significant increase in surface area, and making it possible to prepare green sheets having an increased elongation without using an increased amount of an organic binder. When the organic solvent used in wet grinding is free from an alcohol, wet grinding may be performed in the presence of an organic binder but preferably in the absence of an organic binder. When the solvent is comprised partially or solely of an alcohol, wet grinding should be performed in the presence of an organic binder.

The coarse raw powder material used in the preparation of glass ceramic green sheets comprises a $B_2O_3$-containing glass powder, which can be selected from borosilicate-based glass powders, $MgO-Al_2O_3-SiO_2-B_2O_3$-based glass powders, and $CaO-Al_2O_3-SiO_2-B_2O_3$-based glass powders. These $B_2O_3$-containing glass powders may further contain additional one or more metal oxides such as an alkali metal oxide in a minor amount. A $B_2O_3$-free glass powder may be used in combination with the $B_2O_3$-containing glass powder. The amount of $B_2O_3$ is usually in the range of about 5% to about 30% based on the total weight of the glass powder.

In addition to the $B_2O_3$-containing glass powder, a ceramic powder is usually present as a filler in the raw powder material. The ceramic powder useful as a filler is typically an alumina powder, but one or more powders selected from cordierite, aluminum nitride, quartz, mullite, and the like may be used in place of or in combination with alumina.

The proportions of glass and ceramic powders in the raw powder material are not critical, but the weight ratio of glass to ceramic powder is usually in the range of about 90:10 to about 30:70 and preferably about 80:20 to about 50:50.

As described previously, since commercially available glass and ceramic powders are normally too coarse to be used for tape casting to form green sheets, the raw powder material, which is usually a combination of a glass powder and a ceramic powder, is initially subjected to wet grinding so as to reduce the particle size sufficiently to be suitable for tape casting and thoroughly mix the glass and ceramic powders. In accordance with the present invention, such wet grinding is performed using an organic solvent rather than water as a liquid medium.

Any organic solvent can be used as a liquid medium in wet grinding as long as it does not have an appreciable adverse effect on the glass and ceramic powders. Useful organic solvents include aromatic hydrocarbons such as xylene, toluene, and ethylbenzene ketones such as methyl ethyl ketone and diethyl ketone; esters such as ethyl acetate, isopropyl acetate, and butyl acetate; and alcohols such as ethanol, propanol, isopropanol, butanol, pentanol, and hexanol. One or more of these solvents may be used.

Of these solvents, an alcohol may react with $B_2O_3$-rich phases present in the $B_2O_3$-containing glass powder to cause dissolution of $B_2O_3$ into the solvent. The dissolved $B_2O_3$ tends to combine with the alcohol to form an organoboron compound. Since the bonding strength between the boron and alcohol is high, the alcohol combined with $B_2O_3$ cannot be completely evaporated during firing of green sheets, thereby increasing the amount of residual carbon in the sintered substrate, which, in turn, causes the substrate to turn gray or have a decreased insulation resistance.

In order to eliminate this problem, when the organic solvent used in wet grinding contains an alcohol, an organic binder is added to the organic solvent to dissolve therein and wet grinding is performed in the presence of the organic binder. The surfaces of the glass powder particles are covered with an organic binder and protected in such a manner that the $B_2O_3$-rich phases appearing on the surfaces of the glass powder particles are prevented from reacting with the alcohol and being dissolved in the solvent. Fresh surfaces formed by grinding are also protected by the organic binder in the same manner as above immediately upon formation thereof. As a result, after the firing step, the resulting sintered substrate is prevented from having an increased residual carbon content and hence turning gray and having a decreased insulation resistance. A plasticizer and/or a dispersant may be added to the organic solvent along with the organic binder.

When an alcohol is present in the organic solvent used for wet grinding, the solvent may consist essentially of the alcohol. However, since most organic binders do not have a high solubility in an alcohol, it is preferable that the solvent be a mixed solvent of an alcohol and a non-alcoholic organic solvent. In such cases, the proportions of the alcoholic and non-alcoholic solvents should be selected such that the resulting mixed solvent can dissolve a sufficient amount of the organic binder used in the preparation of green sheets. For example, when the organic binder is an acrylic resin, it is preferable that the proportion of an alcohol in the mixed solvent be 50% by weight or less. In the case of a butyral resin as an organic binder, the proportion of an alcohol is preferably 80% by weight or less.

When the solvent used in wet grinding does not contain an alcohol, it is preferable to perform wet grinding in the absence of an organic binder in view of efficiency of comminution, although an organic binder or a combination of an organic binder and a plasticizer and/or dispersant may be added to the alcohol-free solvent.

The organic solvent is used in wet grinding in an amount sufficient to provide smooth grinding, usually in the range of from about 30 to about 150 parts and preferably from about 30 to 100 parts by weight for each 100 parts by weight of the coarse raw powder material to be ground.

After wet grinding, it is not necessary to remove the organic solvent prior to the preparation of a slurry to be cast into sheets, but the organic solvent can remain so as to constitute part or all of the dispersing medium of the slurry. Therefore, it is not advantageous from a cost viewpoint to increase the amount of the organic solvent used in wet grinding so as to be much larger than the amount used in the preparation of the slurry.

When wet groundinging is performed in the presence of an organic binder of an organic binder and a plasticizer and/or dispersant, it is preferable to add the organic binder in an amount of from about 0.5 to about 10 parts and more preferably from about 0.5 to about 5.0 parts, the plasticizer in an amount of from about 0.1 to about 4.0 parts and more preferably from about 0.5 to about 3.0 parts, and the dispersant in an amount of from about 0.1 to about 3.0 parts and preferably from about 0.5 parts to 2.0 parts, for each 100 parts of the coarse raw powder material to be ground.

The organic binder and plasticizer may be selected from those conventionally used in the preparation of glass ceramic green sheets. Useful organic binders are organic resins including acrylic resins, butyral resins, vinyl acetate copolymers, polyvinyl alcohols, and vinyl chloride resins. Preferably the organic binder is selected from acrylic resins and butyral resins. The plasticizer is preferably selected from phthalate esters such as dioctyl phthalate (DOP) and dibutyl phthalate (DBP), but a polyalkylene glycol such as triethylene glycol may be used as a plasticizer. The dispersant is preferably selected from acrylic acid oligomers and sorbitan monooleate.

Wet grinding of the coarse raw powder material is conveniently performed in a ball mill, but a different type of wet grinding mill such as an attrition mill or bead mill may be used.

In the practice of wet grinding in a ball mill, a glass powder and a ceramic powder both having a coarse particle size may be placed into the ball mill in a predetermined proportion, and an organic solvent and optionally an organic binder and/or a plasticizer are added in amounts in the above-described ranges. Subsequently, ceramic balls made of alumina, for example, are added in an amount of from about 200 to about 500 parts by weight for each 100 parts of the total weight of the coarse powders, and wet ball milling is continued until the powders are comminuted to an average particle size in the range of from about 1 to about 5 μm and preferably from 1.5 to 3.5 μm, for example. Generally about 10 to 100 hours of ball milling are required.

The wet-ground powder mixture is then used to form a slurry (slip) which comprises the powder mixture dispersed in an organic solvent containing an organic binder and optionally a plasticizer and a dispersant. The slurry usually contains, on a weight basis, from about 30 to about 150 parts and preferably from about 30 parts to 100 parts of an organic solvent, from about 5 to about 30 parts and preferably from about 10 parts to 25 parts of an organic binder, from about 0.1 to about 4.0 parts and preferably from about 0.5 parts to 3.0 parts of a plasticizer, and from about 0.1 to about 3.0 parts and preferably from about 0.5 parts to 2.0 parts of a dispersant for each 100 parts of the powder mixture of glass and ceramic powders.

It is advantageous that the organic solvent used in wet grinding and any ingredient (organic binder, plasticizer, and/or dispersant) Added to the solvent for wet grinding be used so as to remain in the slurry. Thus, the powder-containing mixture obtained by removing the ceramic balls may be used as is for the preparation of the slurry. If necessary, the amount of the organic solvent may be adjusted by evaporation or supplementation and an organic binder, a plasticizer, and/or a dispersant may be added to the mixture along with a dispersant. The organic binder, plasticizer, and dispersant used in this step may be selected from the above-described groups.

The resulting slurry is cast into sheets by a conventional manner, usually by tape casting using a doctor blade, and the wet sheets thus-obtained are then dried either at room temperature or at an elevated temperature until a substantial part of the solvent is removed.

In a conventional wet grinding process in water, since the ground powder mixture of glass and ceramic powders is once dried prior to use in the preparation of a slurry, it is necessary to subject the ground powder to disintegration for a prolonged period of time. In accordance with the present invention, however, such a time-consuming disintegration step can be eliminated since the ground powder mixture can be directly used to prepare a slurry without drying.

More importantly, in accordance with the present invention, the increase in specific surface area of the powder mixture during wet grinding can be minimized since the formation of pores in the glass powder due to dissolution of $B_2O_3$ can be effectively prevented. As a result, when the ground powder mixture has an average particle diameter of from 1.5 to 3.5 μm, for example, it will have a specific surface area between about 1.5 and about 5.0 m²/g. In contrast, if wet grinding is conducted in water in a conventional manner until the same average particle diameter is reached, the resulting ground powder mixture will have a specific surface area of about 5 to 10 times as large as the above-described level.

As a result, in order to prepare glass ceramic green sheets having good elongation from a powder mixture which has been wet ground in a conventional manner, it is necessary to add an increased amount of an organic binder to the slurry used to cast into green sheets. On the contrary, with a powder mixture which has been wet ground in an organic solvent in accordance with the present invention, glass ceramic green sheets having good elongation can be formed from a slurry containing a limited amount of an organic binder since the powder mixture is prevented from having an excessively increased surface area, and each particle can be completely covered with such a limited amount of the organic binder.

The good elongation of the glass ceramic green sheets makes it possible to punch them so as to form through holes with a small diameter and a small pitch without the formation of burrs around the holes and cracks between the holes, thereby facilitating an increase in the degree of integration of LSI's and a decrease in the size of printed circuit boards. Furthermore, the use of a limited amount of the organic binder decreases the manufacturing costs of glass ceramics substrates and minimizes the amount of residual carbon in the substrates after firing, thereby preventing the sintered substrates from turning gray and having a decreased insulation resistance.

The glass ceramic green sheets prepared in accordance with the present invention are particularly suitable for use in the production of glass ceramic multilayer substrates by the green sheet laminating process, but they can be used in the production of glass ceramic multilayer substrates by the multilayer printing process on an unfired (green) substrate sheet or in the production of single layer substrates.

The following examples are presented to further illustrate the present invention. These examples are to be considered in all respects as illustrative and not restrictive. In the examples, all percents and parts are by weight unless otherwise indicated.

EXAMPLES

Example 1

The coarse powder material used in this example consisted essentially of an $MgO\text{-}Al_2O_3\text{-}SiO_2\text{-}B_2O_3\text{-}R_2O$ glass powder (R: alkali metal, $B_2O_3$ content: 18%, average particle diameter: 12 μm), an alumina powder (average particle diameter: 10 μm), and a cordierite powder (average particle diameter: 10 μm), all of which were commercially available.

A ball mill was charged with 100 parts of the glass powder, 25 parts of the alumina powder, and 7 parts of the cordierite powder, and an organic solvent or mixed organic solvent indicated in Table 1 was added to the ball mill in an amount between 50 and 150 parts, the amount being selected so as to be equivalent to the volume of water having the same weight as the total weight of the powders (=132 parts). Thereafter, 400 parts of alumina balls (15 mm in diameter) were added and wet grinding was performed for about 48 hours until the powder mixture had an average particle diameter of 2 μm.

After the alumina balls were removed from the resulting mixture, the mixture was dried by heating to completely evaporate the organic solvent in order to determine the specific surface area of the ground powder mixture by the BET adsorption method. The measurement was performed on a Microtix Acusorp Model 2100 (Shimadzu) using a Kr gas for adsorption after deaeration for 60 minutes at 200° C.

To 100 parts of the dried wet-ground powder mixture, 40 parts of xylene as a dispersing medium, 2 parts of DOP (dioctyl phthalate) as a plasticizer, 17 parts of an acrylic resin (polymethyl methacrylate) as an organic binder, and 1 part of an acrylic acid oligomer as a dispersant were added, and the mixture was thoroughly dispersed for 12 hours to form a slurry. The slurry was cast into sheets using a doctor blade, and the wet sheets were dried at 80° C. to form 200 μm-thick green sheets.

The resulting glass ceramic green sheets were evaluated in terms of tensile strength and elongation at break, and punchability as follows.

The tensile test to determine the tensile strength and elongation at break was performed on a tensile testing machine (equipped with a load cell of 5 kg) at a rate of pulling of 20 mm/min using samples measuring 10 mm×20 mm.

The punchability was measured by forming 400 holes (20 holes by 20 holes) in a square sample using an NC punching machine. The diameter of each hole was 3.5 mm and the pitch between two adjacent holes was 4 mm. The punched green sheet sample was observed under a microscope to find burrs around the holes and cracks between the holes. The mark "good" means that no burrs or cracks were found, while the mark "poor" means that the sample showed the formation of burrs and/or cracks.

For comparison, green sheets were prepared in the same manner as described above except that water was used in place of an organic solvent in wet grinding. The amount of water used was the same as the amount of the organic solvent, i.e., the same weight as the total weight of the coarse powders to be ground.

The following Table 1 shows the test results along with the solvent used in wet grinding and the specific surface area of the powder mixture after wet grinding.

TABLE 1

| Run No. | Organic Solvent for Wet Grinding | Specific Surface Area (m²/g) | Properties of Green Sheets | | |
|---|---|---|---|---|---|
| | | | T. S. (kgf/mm²) | % Elongation | Punchability |
| 1 | Xylene | 4.0 | 0.28 | 33.8 | Good |
| 2 | Toluene | 4.1 | 0.30 | 33.2 | Good |
| 3 | EBe | 3.9 | 0.28 | 33.7 | Good |
| 4 | MEK | 4.0 | 0.29 | 33.8 | Good |
| 5 | DEK | 4.0 | 0.30 | 33.2 | Good |
| 6 | MIBK | 4.1 | 0.30 | 33.5 | Good |
| 7 | EAc | 4.0 | 0.33 | 31.2 | Good |
| 8 | IPAc | 4.0 | 0.31 | 33.2 | Good |
| 9 | BuAc | 4.0 | 0.31 | 33.1 | Good |
| 10 | Xylene + Toluene* | 4.0 | 0.32 | 32.6 | Good |
| 11 | Water | 34.4 | 0.63 | 9.6 | Poor |

(Notes)
*Volume ratio of 1:1
Ebe = Ethylbenzene, MEK = Methyl ethyl ketone, DEK = Diethyl ketone, MIBK = Methyl isobutyl ketone, EAc = Ethyl acetate, IPAc = Isopropyl acetate BuAc = Butyl acetate As can be seen from Table 1, in all the runs according to the present invention (Runs Nos. 1 to 10), the wet-ground powder mixture had a specific surface area of around 4.0 m²/g and the tensile strength and elongation of the green sheets were good and well-balanced. The punchability of the green sheets was also good.

In contrast, in Run No. 11 where wet grinding was performed in water, the specific surface area of the wet-ground powder mixture was increased to 34.4 m²/g. As a result, the green sheet had a markedly low elongation although its tensile strength was high, and hence the punchability of the sheet was poor.

It is to be understood that although the wet-ground powder mixture was completely dried by heating in this example in order to determine the specific surface area, such drying is not necessary in the preparation of the slurry to cast into green sheets. Similar results to those shown in Table 1 will be obtained when the slurry is prepared from the wet-ground powder mixture without drying.

Example 2

The coarse raw powder material used in this example consisted of the same powders as in Example 1.

A ball mill was charged with 100 parts of the glass powder, 25 parts of the alumina powder, and 7 parts of the cordierite powder, and 70 parts of an organic solvent comprised of an alcohol (n-butanol, propanol, or n-pentanol) and xylene were added to the ball mill along with up to 10 parts of an organic binder and 1 part of DOP. The organic binder used was either an acrylic resin (polymethyl methacrylate) or a butyral resin (polyvinyl butyral). After 400 parts of alumina balls (15 mm in diameter) were added, wet grinding was performed for about 48 to about 100 hours until the powder mixture had an average particle diameter of 2 μm.

Since wet grinding was performed in the presence of an organic binder in this example, the resulting wet-ground powder mixture had particles covered with the organic binder and it was impossible to determine the specific surface area of the powder mixture.

To the resulting wet-ground mixture from which the alumina balls had been removed, 1.0 part of a dispersant (acrylic acid oligomer) and an additional amount of the same organic binder (acrylic resin or butyral resin) as used in wet grinding were added. The total amount of the organic binder present in the mixture was 15 parts for each 100 parts of the powder mixture. The mixture was thoroughly dispersed for 12 hours to form a slurry. The slurry was cast into sheets using a doctor blade and the wet sheets were dried at 80° C. to form 200 μm-thick glass ceramic green sheets, which had good elongation and punchability comparable to the values shown in Table 1.

The green sheets were fired in air at 900° C. to form sintered glass ceramic substrates, which were visually observed to determine whether they turned gray or not. The following Table 2 (binder: butyral resin) and Table 3 (binder: acrylic resin) show the alcohol used in wet grinding and the proportion thereof in the entire organic solvent as well as the amount of organic binder added prior to wet grinding and the presence or absence of gray color in sintered substrates.

For comparison, the above procedure was repeated except that wet grinding was performed in the absence of an organic binder.

TABLE 2

| Run No. | Solvent for Wet Grinding Alcohol | Wt %* | Butyral Resin Added (Parts) | Color of Sintered Substrate |
| --- | --- | --- | --- | --- |
| 1 | Butanol | 20 | 0 | Gray |
| 2 | Butanol | 50 | 0 | Gray |
| 3 | Butanol | 80 | 0 | Gray |
| 4 | Butanol | 20 | 3 | White |
| 5 | Butanol | 50 | 3 | White |
| 6 | Butanol | 80 | 3 | White |
| 7 | Butanol | 20 | 5 | White |
| 8 | Butanol | 50 | 5 | White |
| 9 | Butanol | 80 | 5 | White |
| 10 | Butanol | 20 | 10 | White |
| 11 | Butanol | 50 | 10 | White |
| 12 | Butanol | 80 | 10 | White |
| 13 | Propanol | 20 | 3 | White |
| 14 | Propanol | 50 | 3 | White |
| 15 | Propanol | 80 | 3 | White |
| 16 | Propanol | 20 | 5 | White |
| 17 | Propanol | 50 | 5 | White |
| 18 | Propanol | 80 | 5 | White |
| 19 | Propanol | 20 | 10 | White |
| 20 | Propanol | 50 | 10 | White |
| 21 | Propanol | 80 | 10 | White |
| 22 | Pentanol | 20 | 3 | White |
| 23 | Pentanol | 50 | 3 | White |
| 24 | Pentanol | 80 | 3 | White |
| 25 | Pentanol | 20 | 5 | White |
| 26 | Pentanol | 50 | 5 | White |
| 27 | Pentanol | 80 | 5 | White |
| 28 | Pentanol | 20 | 10 | White |
| 29 | Pentanol | 50 | 10 | White |
| 30 | Pentanol | 80 | 10 | White |

(Note) *Remainder: Xylene

TABLE 3

| Run No. | Solvent for Wet Grinding Alcohol | Wt %* | Acrylic Resin Added (Parts) | Color of Sintered Substrate |
| --- | --- | --- | --- | --- |
| 31 | Butanol | 20 | 0 | Gray |
| 32 | Butanol | 50 | 0 | Gray |
| 33 | Butanol | 20 | 3 | White |
| 34 | Butanol | 50 | 3 | White |
| 35 | Butanol | 20 | 5 | White |
| 36 | Butanol | 50 | 5 | White |
| 37 | Butanol | 20 | 10 | White |
| 38 | Butanol | 50 | 10 | White |
| 39 | Propanol | 20 | 3 | White |
| 40 | Propanol | 50 | 3 | White |
| 41 | Propanol | 20 | 5 | White |
| 42 | Propanol | 50 | 5 | White |
| 43 | Propanol | 20 | 10 | White |
| 44 | Propanol | 50 | 10 | White |
| 45 | Pentanol | 20 | 3 | White |
| 46 | Pentanol | 50 | 3 | White |
| 47 | Pentanol | 20 | 5 | White |
| 48 | Pentanol | 50 | 5 | White |
| 49 | Pentanol | 20 | 10 | White |
| 50 | Pentanol | 50 | 10 | White |

(Note)* Remainder: Xylene

As can be seen from Tables 2 and 3, when the organic solvent used in wet grinding contained an alcohol, wet grinding in the absence of an organic binder resulted in the formation of gray-colored sintered glass ceramic substrates after firing. However, the presence of a small amount of an organic binder in the alcohol-containing organic solvent used in wet grinding could avoid such coloration of the sintered substrate.

It will be appreciated by those skilled in the art that numerous variations and modifications may be made to the invention as described above with respect to specific embodiments without departing from the spirit or scope of the invention as broadly described.

What is claimed is:

1. A process for preparing boron-containing glass ceramic green sheets comprising the steps of:

forming a wet ground powder by wet-grinding a coarse raw powder material which comprises a $B_2O_3$-containing glass powder in an alcohol-free organic solvent in the presence or absence of an organic binder until the particle size is sufficiently reduced to be suitable for tape casting, forming a slurry in which the wet-ground powder is dispersed in an organic solvent containing at least an organic binder, casting the slurry into sheets, and drying the resulting wet sheets.

2. A process for preparing boron-containing glass ceramic green sheets comprising the steps of:

forming a wet ground powder by wet-grinding a coarse raw powder material which comprises a $B_2O_3$-containing glass powder in an alcohol-containing organic solvent in the presence of an organic binder until the particle size is sufficiently reduced to be suitable for tape casting, forming a slurry in which the wet-ground powder is dispersed in an organic solvent containing at least an organic binder, casting the slurry into sheets, and drying the resulting wet sheets.

3. The process of claim 2 wherein the organic binder is an acrylic resin and the proportion of the alcohol in the organic solvent is not greater than 50% by weight.

4. The process of claim 2 wherein the organic binder is a butyral resin and the proportion of the alcohol in the organic solvent is not greater than 80% by weight.

5. The process of claim 1 wherein the $B_2O_3$-containing glass powder is selected from the group consisting of borosilicate-based glass powders, $MgO-Al_2O_3-SiO_2-B_2O_3$-based glass powders, and $CaO-Al_2O_3-SiO_2-B_2O_3$-based glass powders.

6. The process of claim 2 wherein the $B_2O_3$-containing glass powder is selected from the group consisting of borosilicate-based glass powders, $MgO-Al_2O_3-SiO_2-B_2O_3$-based glass powders, and $CaO-Al_2O_3-SiO_2-B_2O_3$-based glass powders.

7. The process of claim 1 wherein the coarse raw powder material further comprises a ceramic powder as a filler.

8. The process of claim 2 wherein the coarse raw powder material further comprises a ceramic powder as a filler.

9. The process of claim 1 wherein the wet grinding is performed by ball milling.

10. The process of claim 2 wherein the wet grinding is performed by ball milling.

11. The process of claim 1 wherein a plasticizer is further present in the organic solvent used in wet grinding.

12. The process of claim 2 wherein a plasticizer is further present in the organic solvent used in wet grinding.

13. The process of claim 1 wherein a dispersant is further present in the organic solvent used in wet grinding.

14. The process of claim 2 wherein a dispersant is further present in the organic solvent used in wet grinding.

15. The process of claim 1 wherein a plasticizer and a dispersant are further present in the organic solvent used in wet grinding.

16. The process of claim 2 wherein a plasticizer and a dispersant are further present in the organic solvent used in wet grinding.

17. The process of claim 1 wherein the wet grinding is continued until the powders are comminuted to an average particle size in the range of from about 1 to about 5 µm.

18. The process of claim 2 wherein the wet grinding is continued until the powders are comminuted to an average particle size in the range of from about 1 to about 5 µm.

19. The process of claim 1 wherein during the wet grinding the coarse raw powder material is wet ground in a non-aqueous medium, the glass powder contains 5 to 30 weight % $B_2O_3$ or the glass powder is present in an mount of 30 to 90 weight % of the coarse raw powder.

20. The process of claim 2 wherein during the wet Finding the coarse raw powder material is wet ground in a non-aqueous medium, the glass powder contains 5 to 30 weight % $B_2O_3$ or the glass powder is present in an mount of 30 to 90 weight % of the coarse raw powder.

21. The process of claim 1 wherein the organic binder covers essentially all surfaces of the $B_2O_3$-containing glass powder.

22. The process of claim 2 wherein the organic binder covers essentially all surfaces of the $B_2O_3$-containing glass powder, the organic binder protecting $B_2O_3$-rich phases appearing on surfaces of the glass powder from reacting with alcohol in the alcohol-containing organic solvent.

* * * * *